US006837666B1

(12) United States Patent
Panzarella et al.

(10) Patent No.: US 6,837,666 B1
(45) Date of Patent: Jan. 4, 2005

(54) DEVICE FOR SECURING A PERSONAL-TRANSPORT VEHICLE TO A LIFT AND CARRIER ASSEMBLY

(75) Inventors: Thomas A. Panzarella, Blue Bell, PA (US); James B. Eldon, III, Barto, PA (US); David D. McClanahan, Harleysville, PA (US)

(73) Assignee: Cook Technologies, Inc., Green Lane, PA (US)

( * ) Notice: Subject to any disclaimer, the term of this patent is extended or adjusted under 35 U.S.C. 154(b) by 353 days.

(21) Appl. No.: 10/126,791

(22) Filed: Apr. 19, 2002

(51) Int. Cl.[7] .............................................. B60P 3/073

(52) U.S. Cl. ..................... 414/462; 248/503; 296/65.1; 297/DIG. 4; 410/7; 410/22; 410/80; 414/921

(58) Field of Search ............................ 248/503, 503.1; 296/65.1; 297/DIG. 4; 410/3, 4, 7, 9, 19, 22, 23, 51, 80, 81; 414/462, 540, 921

(56) References Cited

U.S. PATENT DOCUMENTS 4,520,893 A * 6/1985 Keough ...................... 180/326
4,623,289 A * 11/1986 Apostolos ...................... 410/7
4,690,364 A 9/1987 Constantin ............... 248/503.1
4,805,954 A * 2/1989 Lazaroff .................. 296/65.04
4,973,022 A * 11/1990 Mayland .................. 248/503.1
5,489,170 A * 2/1996 Inoue et al. .................. 410/7
5,628,595 A * 5/1997 Harris .......................... 410/7
5,713,704 A * 2/1998 Pommier et al. .............. 410/9
6,224,131 B1 * 5/2001 Shammout ................. 296/68.1
6,231,283 B1 * 5/2001 Stowers ......................... 410/8
6,352,396 B1 * 3/2002 Budd et al. .................... 410/8
6,692,215 B1 * 2/2004 Panzarella et al. .......... 414/462

OTHER PUBLICATIONS

U.S. patent application Ser. No. 10/077,535, Panzarella et al., filed Feb. 15, 2002.

* cited by examiner

*Primary Examiner*—Janice L. Krizek
(74) *Attorney, Agent, or Firm*—Woodcock Washburn LLP

(57) ABSTRACT

A presently-preferred device for securing a personal-transport vehicle to a platform comprises a trunnion member adapted to be fixedly coupled to the personal-transport device and comprising a first and a second trunnion. The presently-preferred device also comprises a receptacle comprising a yoke arm adapted to be fixedly coupled to the platform and comprising two side panels each having a slot formed therein. The receptacle further comprises two hook levers pivotally coupled to the respective side panels. The hook levers are pivotally biased so that the hook levers contact respective trunnions and interfere with movement thereof toward open ends of the slots when the platform is in an upper position, whereby the trunnion member is secured to the receptacle.

26 Claims, 6 Drawing Sheets

DEVICE FOR SECURING A PERSONAL-TRANSPORT VEHICLE TO A LIFT AND CARRIER ASSEMBLY

FIELD OF THE INVENTION

The present invention relates to carrier devices, also referred to as "lift and carrier assemblies," for personal-transport vehicles. More particularly, the present invention relates to a device for securing a personal-transport vehicle, such as a power chair, to a platform of a lift and carrier assembly.

BACKGROUND OF THE INVENTION

Personal-transport vehicles such as power chairs are commonly used by individuals with ambulatory difficulties or other disabilities. Various types of lift and carrier assemblies have been developed to facilitate the transportation of power chairs using passenger cars and other motorized vehicles. Lift and carrier assemblies are typically mounted on a trailer hitch or similar connecting point on the motorized vehicle. The power chair rides outside of the motorized vehicle on a platform or similar-type component of the lift and carrier assembly. The lift and carrier assembly typically includes provisions that permit the power chair to be driven onto the platform at ground level, and then lifted to prevent contact with the road surface during transport.

Lift and carrier assemblies usually include some type of mechanism that automatically secures the power chair in place during transport. For example, the lift and carrier assembly may be equipped with a lever arm adapted to exert a substantial downward force on the power chair by way of a padded foot or other suitable member. The lever arm may be adapted to automatically rotate the foot into and out of contact with the power chair as the platform is moved between its upper and lower positions.

The use of a lever arm to secure the power chair requires that the power chair have a rigid surface that is within the range of motion of the securing foot. Moreover, the rigid surface must be able to withstand the substantial downward force exerted by the foot. Many contemporary personal-transport vehicles, e.g., power chairs, are typically not equipped with a surface that satisfies these requirements. Hence, securing devices theat rely on a lever arm and foot are incompatible with many applications.

Another common means for securing a power chair to a lift and carrier assembly relies on a single, vertically-oriented pin and a receptacle adapted to receive the pin. The receptacle is typically fixed to the platform of the lift and carrier assembly, and the pin is fixed to the power chair. The receptacle is adapted to securely engage the pin when the power chair is in a predetermined position on the platform. The engagement of the pin and the receptacle secures the power chair to the platform.

The restraint provided by a single vertical pin may be unacceptable under certain circumstances. In particular, a single pin generally cannot prevent the power chair from rotating (swiveling) around the pin. This lack of restraint can result in the power chair moving from its stored position on the platform when the transporting vehicle turns at relatively high speed, brakes suddenly, or bounces in response to rough road conditions. Moreover, the swiveling movement of the power chair, in extreme cases, can result in a potentially catastrophic separation of the power chair from the lift and carrier assembly.

Furthermore, the receptacle of the single-pin restraint is usually mounted in the center of the platform. Hence, the platform cannot be equipped with a ramp or other supporting surface positioned along the center thereof. This constraint precludes the use of the single-pin restraint with personal-transport devices comprising a centrally-located wheel, e.g., three-wheeled scooters. Also, the pin is usually not visible to the individual loading the power chair. Hence, the single-pin restraint does not provide a positive visual indication that the power chair has been properly secured to the lift and carrier assembly.

A need therefore exists for a device for securing a personal-transport vehicle to a lift and carrier assembly that is compatible with a wide range of personal-transport vehicles, provides a positive visual indiction that the personal-transport vehicle is secured, and that securely restrains the personal-transport vehicle under adverse conditions such as high-speed turns, sudden braking, and violent bouncing.

SUMMARY OF THE INVENTION

A presently-preferred device for securing a personal-transport vehicle to a platform movable between a lower position proximate the ground, and an upper position, comprises a trunnion member comprising a trunnion bracket adapted to be fixedly coupled to the personal-transport device, and a first and a second trunnion fixedly coupled to opposing sides of a trunnion bracket.

The presently-preferred device also comprises a receptacle comprising a yoke arm adapted to be fixedly coupled to the platform and comprising a first and an opposing second side panel each having a slot formed therein, the slots each having an open end through which the slots are adapted to receive a respective one of the first and second trunnions, and a closed end. The receptacle further comprises a first and a second hook lever pivotally coupled to the respective first and second side panels. The first and second hook levers are pivotally biased so that the first and second hook levers contact the respective first and second trunnions and interfere with movement of the respective first and second trunnions toward the open ends of the respective slots when the platform is in the upper position, whereby the trunnion member is secured to the receptacle.

A presently-preferred device for securing a personal-transport vehicle to a platform of a lift and carrier assembly adapted to move the platform between a lower position proximate the ground, and an upper position comprises a trunnion member comprising a trunnion bracket adapted to be fixedly coupled to the personal-transport vehicle and having a first and an opposing second lip portion, and a first and a second substantially cylindrical trunnion fixedly coupled to and extending from the respective first and second lip portions.

The presently-preferred device also comprises a receptacle comprising a substantially U-shaped yoke arm adapted to be fixedly coupled to the platform and comprising a first and an opposing second side panel each having a slot formed therein. The slots each have an open end through which the slots are adapted to receive a respective one of the first and second trunnions, and a closed end. The receptacle also comprises a first and a second hook lever pivotally coupled to the respective first and second side panels and being movable to and from a locking position and a releasing position in response to movement of the platform to and from the upper to the lower positions.

The first and second hook levers each have a substantially hook-shaped portion adapted to securely engage the respective first and second trunnions when the first and second hook levers are in the locking position so that the first and second trunnions are restricted from moving toward the open ends of the respective slots, whereby the trunnion member is secured to the receptacle when the platform is in the upper position.

Another presently-preferred device for securing a personal-transport vehicle to a platform movable between a lower position proximate the ground, and an upper position, comprises a trunnion member comprising a trunnion bracket adapted to be fixedly coupled to the personal-transport device, and a first and a second trunnion fixedly coupled to opposing sides of a trunnion bracket.

The presently-preferred device also comprises a receptacle comprising a yoke arm adapted to be fixedly coupled to the platform and comprising a first and an opposing second side panel each having a slot formed therein, the slots being adapted to receive a respective one of the first and second trunnions. The receptacle further comprises means for confining the first and second trunnion within the respective slots responsive to movement of the platform from the lower to the upper positions.

Another presently-preferred device for securing a personal-transport vehicle to a platform of a lift and carrier assembly adapted to move the platform in a first direction between a lower position proximate the ground, and an upper position comprises a trunnion member comprising a trunnion bracket adapted to be fixedly coupled to the personal-transport vehicle and having a first and an opposing second lip portion, and a first and a second trunnion fixedly coupled to and extending from the respective first and second lip portions along an axis oriented in a second direction substantially perpendicular to the first direction.

The presently-preferred device also comprises a receptacle comprising a substantially shaped yoke arm adapted to be fixedly coupled to the platform and comprising a first and an opposing second side panel each having a slot formed therein. The slots are adapted to receive the respective first and second trunnions through respective open ends thereof, and the slots each having a closed end defined by a substantially curvilinear edge portion on the respective first and second side panels.

The receptacle further comprises a first and a second hook lever pivotally coupled to the respective first and second side panels and being movable between a locking position and a releasing position. The first and second hook levers are biased toward the locking position, the first and the second trunnions intersect respective planes of rotation of the first and second hook levers are adapted to urge the respective first and second trunnions toward the substantially curvilinear edge portions of the respective first and second side panels when the first and second hook levers are in the locking position, thereby securing the trunnion member to the receptacle.

The receptacle also comprises a first and a second wheel rotatably coupled to the respective first and second hook levers and being adapted to contact the ground when the platform is moved from the upper to the lower position. The contact between the wheels and the ground causes the first and second hook levers to pivot away from the respective first and second trunnions thereby releasing the first and second trunnion members from the receptacle.

BRIEF DESCRIPTION OF THE DRAWINGS

The foregoing summary, as well as the following detailed description of a presently-preferred embodiment, is better understood when read in conjunction with the appended drawings. For the purpose of illustrating the invention, the drawings show an embodiment that is presently preferred. The invention is not limited, however, to the specific instrumentalities disclosed in the drawings. In the drawings.

DESCRIPTION OF PREFERRED EMBODIMENTS

FIGS. 1–7 depict a presently-preferred embodiment of a latching device 10 for securing a personal-transport vehicle to a platform of a lift and carrier assembly. A presently-preferred embodiment is described herein in connection with a power chair 14, and a lifting device 12 having a platform 20 adapted to support the power chair 14. These particular types of personal-transport vehicle and lifting device are described for exemplary purposes only, as the presently-preferred device can be used in connection with virtually any type of personal-transport vehicle and any type of supporting surface.

Figure 4:
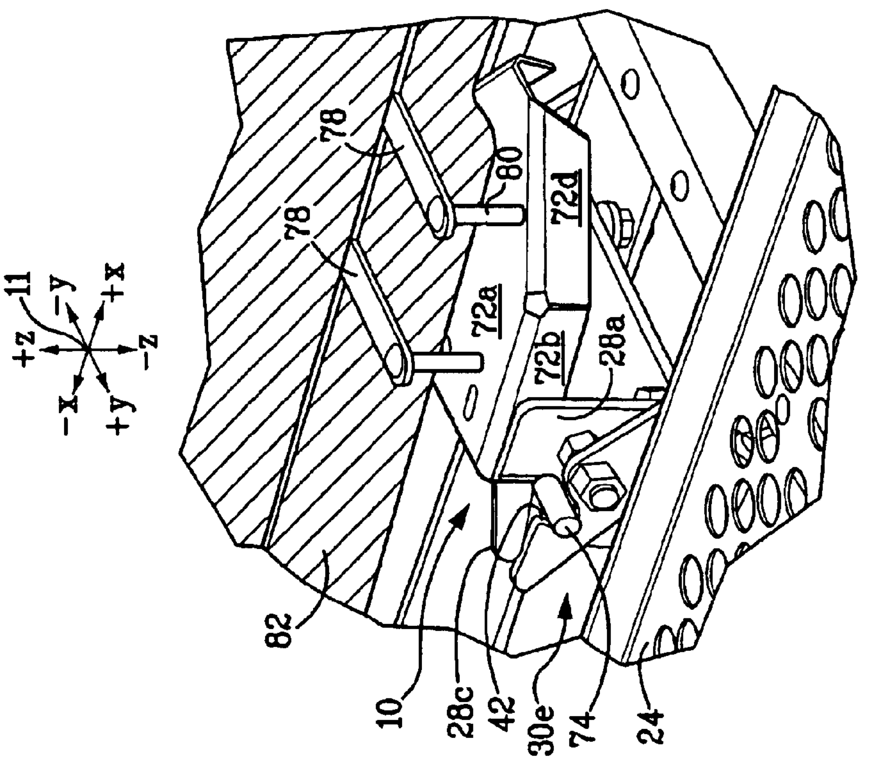
FIG. 4 is a magnified view of the area designated "B" in FIG. 3.
Figure 3:
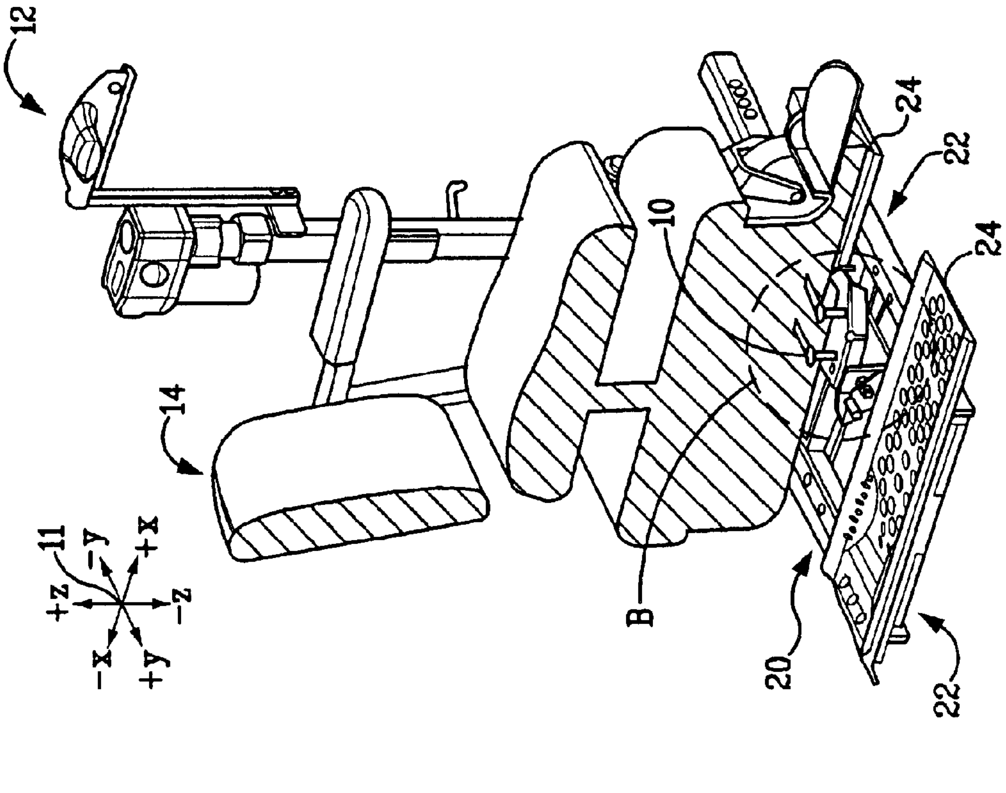
FIG. 3 is a perspective view of the presently-preferred device, the lift and carrier assembly, and the power chair shown in FIGS. 1 and 2, depicting a cross-section of the power chair taken through the line "A—A" of FIG. 2.
Figure 5:
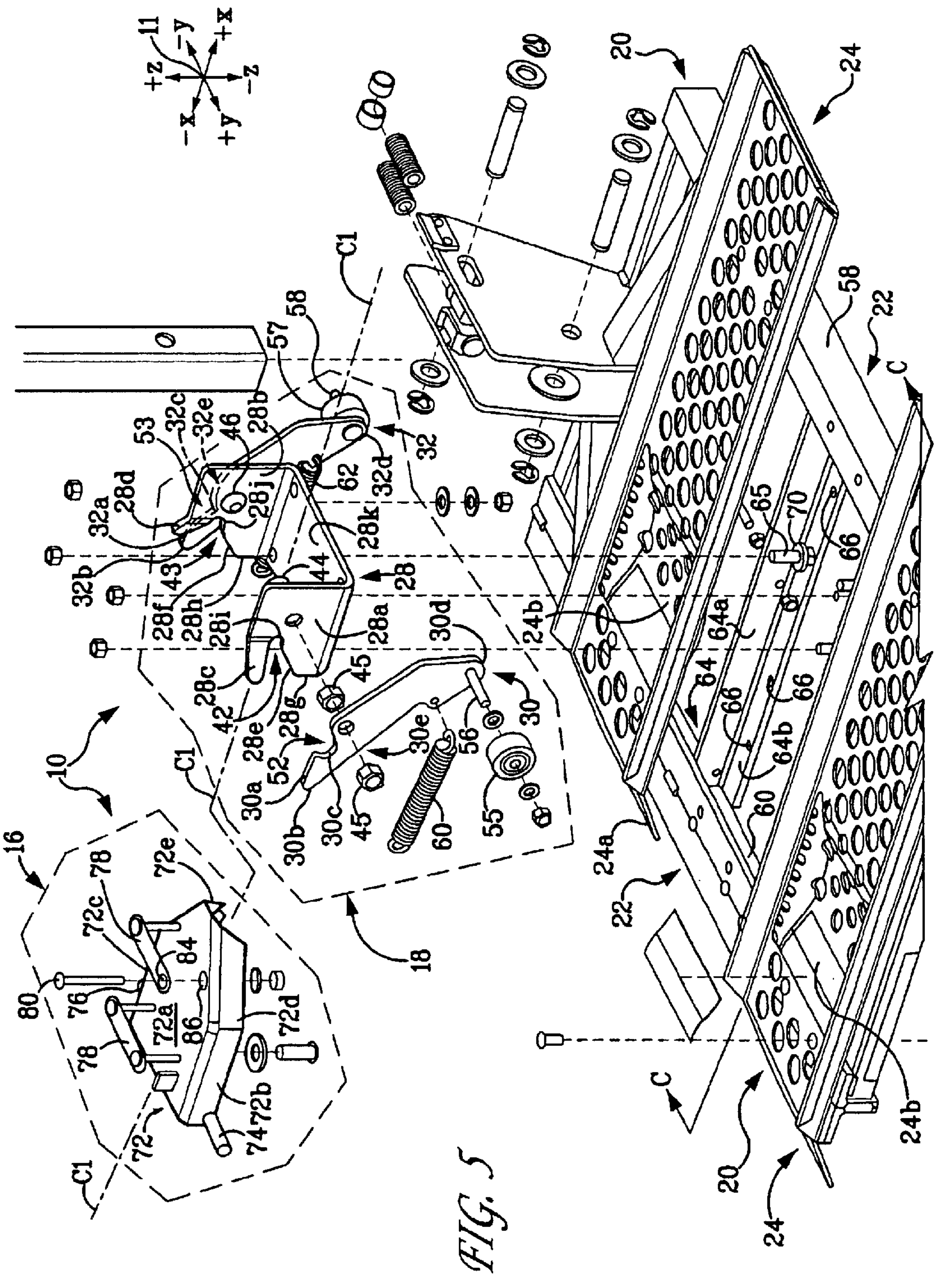
FIG. 5 is a partially exploded perspective view of the presently-preferred device and the lift and carrier assembly depicted in FIGS. 1–4.

The device 10 comprises a trunnion member 16 and a receptacle 18 (see, e.g., Figures 4 and 5). The trunnion member 16 is adapted to be fixedly coupled to the power chair 14, and the receptacle 18 is adapted to be fixedly coupled to the platform 20. The receptacle 18 is adapted to securely receive the trunnion member 16 when the power chair 14 is driven onto the platform 20, as explained in detail below.

The lift and carrier assembly 12 is adapted for installation on a motor vehicle such as an automobile or a van, and thereby facilitates transportation of the power chair 14 by the motor vehicle (this motor vehicle is hereinafter referred to as a "transporting vehicle"). The lift and carrier assembly 12 is capable of raising and lowering the platform 20 between a lower position proximate the ground (see FIG. 6)) and an upper position (see FIG. 7). The power chair 14 is loaded onto the lift and carrier assembly 12 while the platform 20 is in the lower position, and the power chair 14 is transported while the platform 20 is in the upper position.

The platform 20 is comprises a frame member 22 and two tracks 24 fixedly coupled to the frame member 22. Each track 24 is adapted to receive a front wheel 26*a* and a rear wheel 26*b* of the power chair 14 (see FIGS. 2, 6, and 7). The tracks 24 each include a ramp portion 24*a* positioned at an end thereof, and each track 24 has a substantially curvilinear indentation 24*b* formed therein (see FIGS. 5–7). (It should be noted that the device 10 is equally suitable for use with platforms 20 comprising more or less than two of the tracks 24 30 installed thereon.)

Figure 6:
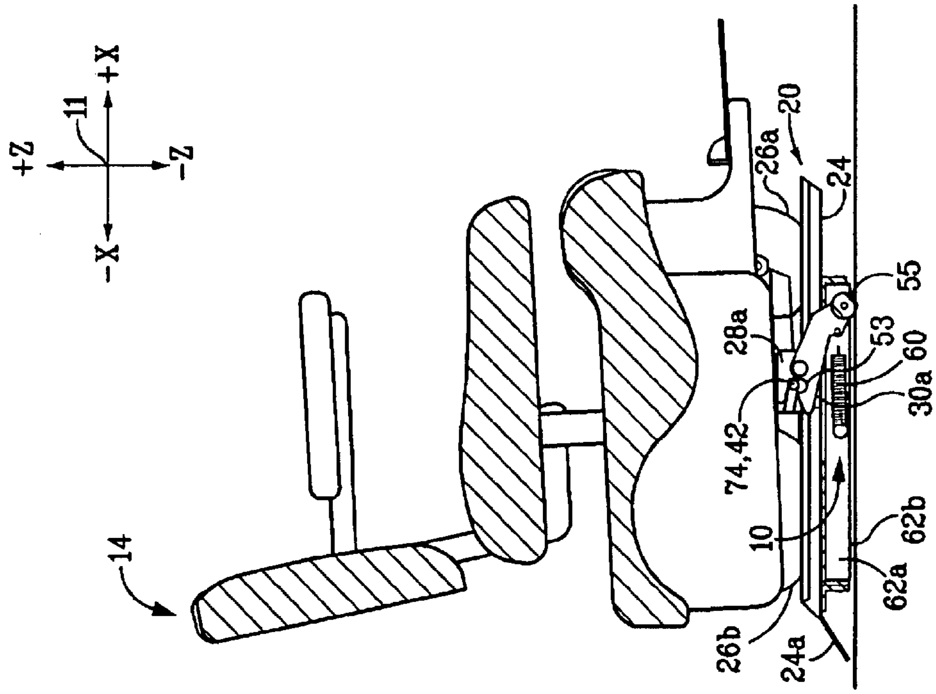
FIG. 6 is a side view of the presently-preferred device, a platform of the lift and carrier assembly, and the power chair shown in FIGS. 1–5, depicting a cross-section of the power chair taken through the line "A—A" of FIG. 2 and a cross-section of the platform taken through the line "C—C" of FIG. 5, and depicting the platform in a lower position and the power chair in its stored position on the platform.

The ramp portions 24*a* each contact the ground when the platform 20 is in its lower position, thereby permitting the power chair 14 to be driven (or pushed) onto the platform 20 (see FIG. 6). The indentations are positioned so that the rear wheels 26*b* rest within the indentations when the power chair 11 has been driven fully onto the platform 20, i.e., when the power chair 14 is located in a position suitable for transport (this position is hereinafter referred to as the "stored" position of the power chair 14, and is depicted in FIGS. 2, 3, 6, and 7). (The direction of motion of the power chair 14 as the power chair 14 is driven onto and off of the platform 20 is depicted by the arrow 102 in FIG. 8).

The lift and carrier assembly 12 is adapted to raise the platform 20 to the upper position once the power chair 14 has been moved into its stored position thereon, thereby facilitating transport of the power chair 12 by the transporting vehicle. Further details concerning the lift and carrier assembly 12 are set forth in co-pending U.S. patent application Ser. No. 10/077,535, filed Feb. 15, 2002, which is incorporated by reference herein in its entirety. The engagement of the trunnion member 16 and the receptacle 18 of the device 10 secures the power chair 14 to the platform 20, and thereby prevents separation of the power chair 14 from the lift and carrier assembly 12 as the power chair 14 is being transported.

Structural details relating to the receptacle 18 are as follows. The receptacle 18 comprises a yoke bracket 28, a first hook lever 30, and a second hook lever 32 (see FIG. 5). The first and second hook levers 30, 32 are pivotally coupled to the yoke bracket 28, as explained in detail below.

The yoke bracket 28 comprises a first and a second side panel 28*a*, 28*b*, and a bottom panel 28*k*. The side panels 28*a*, 28*b* adjoin opposing ends the bottom panel 28*k*, and are substantially perpendicular to the bottom panel 28*k*. This configuration gives the yoke bracket 28 a substantially U-shaped profile, as shown in FIG. 5.

The first side panel 28*a* comprises a tab portion 28*c* and the second side panel 28*b* comprises a tab portion 28*d*. The tab portions 28*c*, 28*d* are each angled outwardly, i.e., away from the longitudinal centerline of the receptacle 18 (the longitudinal centerline is denoted by the symbol "Cl" in FIG. 5).

The first side panel 28*a* has an angled edge 28*e* that extends upwardly (in the "+z" direction) from an end 28*g* of the first side panel 28*a* (the figures are each referenced to a common coordinate system 11 depicted therein). The angled surface 28*e* and the tab portion 28*c* adjoin opposing ends of a substantially C-shaped edge 28*i*. The C-shaped edge 28*i* forms a rearwardly-facing open-ended slot 42 in the side panel 28*a*. The second side panel 28*b* likewise has an angled edge 28*f* that extends upwardly from an end 28*h* of the second side panel 28*b*. The angled surface 28*f* and the tab portion 28*d* adjoin opposing ends of a substantially C-shaped edge 28*j*. The C-shaped edge 28*j* forms a rearwardly-facing open-ended slot 43 in the side panel 28*b*. The significance of these features is discussed below.

The first and second hook levers 30, 32 are pivotally coupled to the yoke arm 28, as previously noted. More particularly, the first hook lever 30 is pivotally coupled to the side panel 28*a* by way of a threaded pin 44 (see FIG. 5). The pin 44 is accommodated within through holes formed in each of the side panel 28*a* and the hook lever 30, and is axially restrained by bolts 45 located on opposing sides of the hook lever 30. The second hook lever 32 is pivotally coupled to the side panel 28*b* by way of a threaded pin 46. The pin 46 is accommodated within through holes formed in each of the side panel 28*b* and the hook lever 32, and is axially restrained by bolts (not shown) located on opposing sides of the hook lever 32.

The hook levers 30, 32 are adapted to pivot between a locking position (see, e.g., FIGS. 4 and 7) and a releasing position (FIG. 6). The hook levers 30, 32 are pivotally biased in a clockwise direction (from the perspective of FIGS. 6 and 7) by respective springs 60, 62. In other words, the springs 60, 62 bias the hook levers 30, 32 toward the locking position. The springs 60, 62 each have a spring rate (spring constant) of approximately 8.2 pounds per inch. (The spring rate is application-dependent; a particular value for this parameter is presented for exemplary purposes only.)

The hook lever 30 has a substantially straight upper edge 30*a* that extends inwardly from a rearward edge 30*b* thereof. The hook lever 30 also has a rounded edge 30*c* that adjoins the upper edge 30*a*. The rounded edge 30*c* forms an indentation 52 in the hook lever 30. Moreover, the rounded edge 30*c* and the upper edge 30*a* define a hook-shaped portion 30*e* on the hook lever 32.

It should be noted that directional terms such as "upper," "lower," "upwardly," and "downwardly" reference the component orientation depicted in the figures. These terms are used for illustrative purposes only and, unless expressly stated otherwise, are not intended to limit the scope of the appended claims.

The hook lever 32 likewise has a substantially straight upper edge 32*a* that extends inwardly from a rearward edge 32*b* thereof. The hook lever 32 also has a rounded edge 32*c* that adjoins the upper edge 32*a*. The rounded edge 32*c* forms an indentation 53 in the hook lever 32. Moreover, the rounded edge 32*c* and the upper edge 32*a* define a hook-shaped portion 32e on the hook lever 32. This significance of these features is explained below.

The hook levers 30, 32 are restrained from clockwise rotation past the their respective locking positions by the tab portions 28*c*, 28*d* on the yoke arm 28. More particularly, the tab portion 28*c* is located above the upper edge 32*a* of the hook lever 30, and intersects the plane of rotation of the hook lever 30. Clockwise rotation of the hook lever 30 causes the upper edge 30*a* to contact the tab portion 28*c* as the hook lever 30 reaches the locking position. This contact interferes with further clockwise movement of the hook lever 30, and thereby prevents the hook lever 30 from pivoting past the locking position.

The tab portion 28*d* is located above the upper edge 32*a* of the hook lever 32, and intersects the plane of rotation of the hook lever 32. Clockwise rotation of the hook lever 32 causes the upper edge 30*a* to contact the tab portion 28*d* as the hook lever 30 reaches the locking position. This contact interferes with further clockwise movement of the hook lever 32, and thereby prevents the hook lever 32 from pivoting past the locking position.

Figure 7:
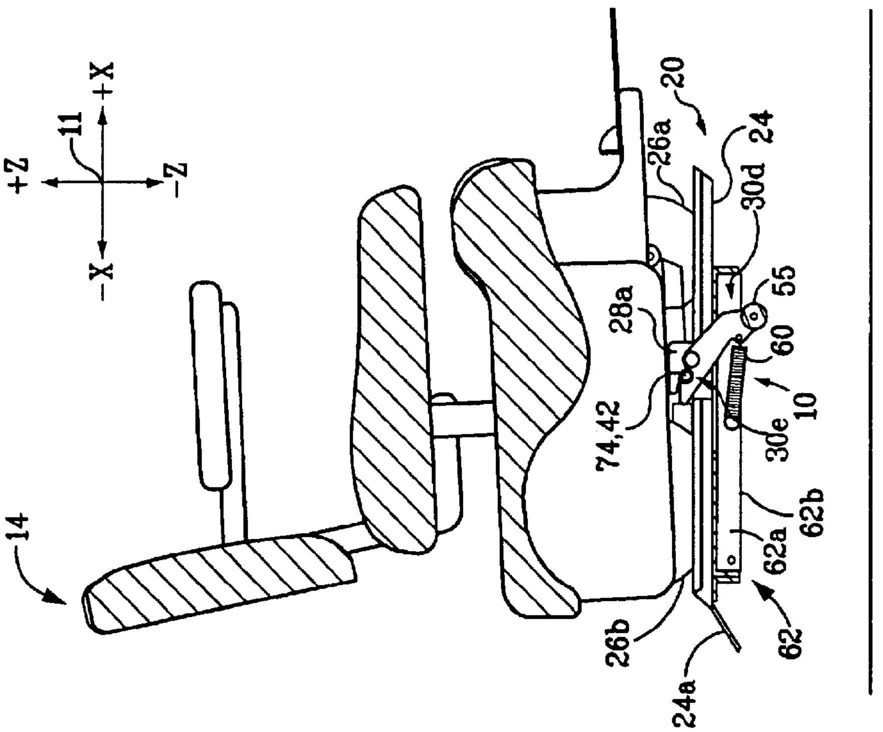
FIG. 7 is a side view of the presently-preferred device, the platform, and the power chair shown in FIGS. 1–6, depicting a cross-section of the power chair taken through the line "A—A" of FIG. 2 and a cross-section of the platform taken through the line "C—C" of FIG. 5, and depicting the platform in an upper position and the power chair in its stored position on the platform.

A wheel 55 is rotatably coupled to the hook lever 30 by way of an axle member 56 fixed to the hook lever 30 proximate an end 30*d* thereof. A wheel 57 is rotatably coupled to the hook lever 32 by way of an axle member 58 fixed to the hook lever 32 proximate an end 32*d* thereof. The wheels 55, 57 are located below the lowermost surface of the platform 20 when the hook levers 30, 32 are in their locking positions, as depicted in FIG. 7. The significance of this feature, and the function of the wheels 55, 57 are discussed below.

Figure 9:
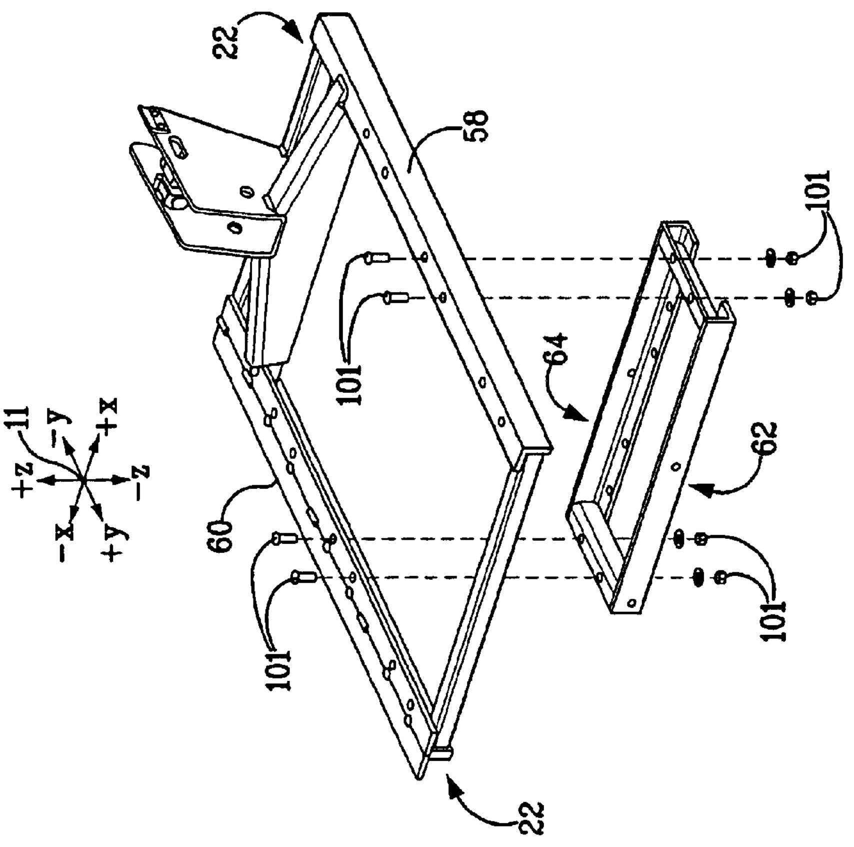
FIG. 9 is a partially exploded, perspective view of an alternative mounting configuration for a first and second bridge weldment for coupling the presently-preferred device to a frame member of the platform shown in FIGS. 1–8.

The receptacle 18 is fixedly coupled to the platform 20, as noted above. More specifically, the receptacle 18 is mounted on a first and a second bridge weldment 62, 64 (see FIGS. 5–7). The bridge weldments 62, 64 extend substantially in the "x" direction, and opposing ends of each bridge weldment 62, 64 are welded to first and second transverse frame members 58, 60 of the platform 20. Alternatively, the bridge weldments 62, 64 can be coupled to the transverse frame members 58, 60 through the use of fasteners 101, as depicted in FIG. 9.

The bridge weldments 62, 64 each have a substantially L-shaped cross section. In particular, the bridge weldment 62 comprises a first portion 62*a* and an adjoining, substantially perpendicular second portion 62*b*. The bridge weldment 64 likewise comprises a first portion 64*a* and an adjoining, substantially perpendicular second portion 64*b*. The springs 60, 62 are coupled to the respective first portions 64*a*, 64*b* (see, e.g., FIGS. 6 and 7).

The bridge weldments 62, 64 are spaced apart by a distance substantially equal to the width, i.e., y-direction dimension, of the yoke arm 28. Opposing ends of the bottom panel 28*k* of the yoke arm 28 rest on the respective second portions 62*b*, 64*b* of the bridge weldments 62, 64, either directly or on washers 70 positioned between the bottom panel 28*k* and the second portions 62*b*, 64*b* (see FIG. 5). Moreover, the side panels 28*a*, 28*b* of the yoke arm 28 are positioned inward of the respective first portions 62*a*, 62*b* (in relation to the centerline Cl).

The hook lever 30 is positioned outward of the first portion 62*a*, and the hook lever 32 is positioned outward of the second portion 64*a* (in relation to the centerline Cl). Hence, the second portions 62*b*, 64*b* of the bridge weldments 62, 64 are not located in the plane of rotation of the respective hook levers 30, 32.

The yoke arm 28 is secured to the bridge weldments 62, 64 by fasteners 65 accommodated by through holes 66 formed in the second portions 62*b*, 64*b*, and through holes 68 formed in the bottom panel 28*k*. It should be noted that additional through holes 66 are formed in-the bridge weldments 62, 64 to permit the relative positions of the yoke arm 28 and the platform 20 to be varied in the longitudinal ("x") direction. Moreover, the height (z-axis position) the yoke arm 28 can be varied in relation to the platform 20 by varying the number of washers 70 positioned between the bottom panel 28*k* and the second portions 62*b*, 64*b*.

The trunnion member 16 is adapted to be fixedly coupled to the power chair 14, as noted above. The trunnion member 16 comprises a trunnion bracket 72 and a first and second trunnion 74, 76 (see FIG. 5). The trunnion bracket 72 comprises a substantially flat mounting portion 72*a*, a first lip 72*b* that extends downwardly from the mounting portion 72*a*, and a second lip 72*c* that extends downwardly from an opposing side of the mounting portion 72*a*. The trunnion bracket 72 has a width (y-axis dimension) that permits the trunnion bracket 72 to fit within the yoke arm 28 with minimal clearance between the first lip 72*b* and the side panel 28*a*, and between the second lip 72*c* and the side panel 28*b*.

Figure 2:
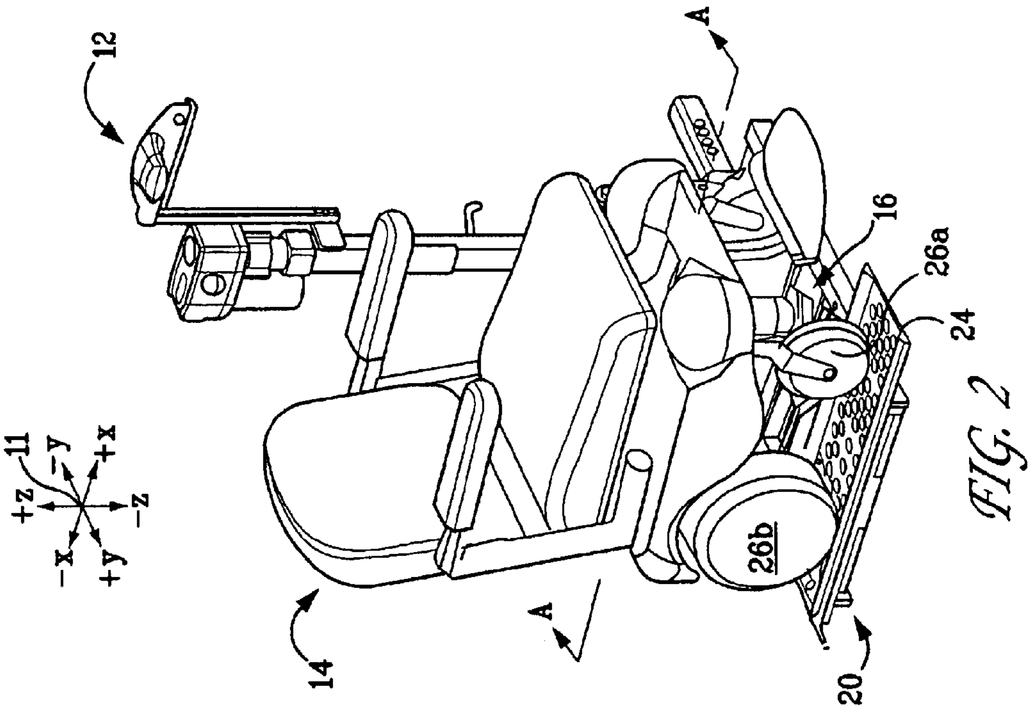
FIG. 2 is a perspective view of the presently-preferred device and the lift and carrier assembly shown in FIG. 1, with a power chair secured to the lift and carrier assembly using the presently-preferred device.
Figure 1:
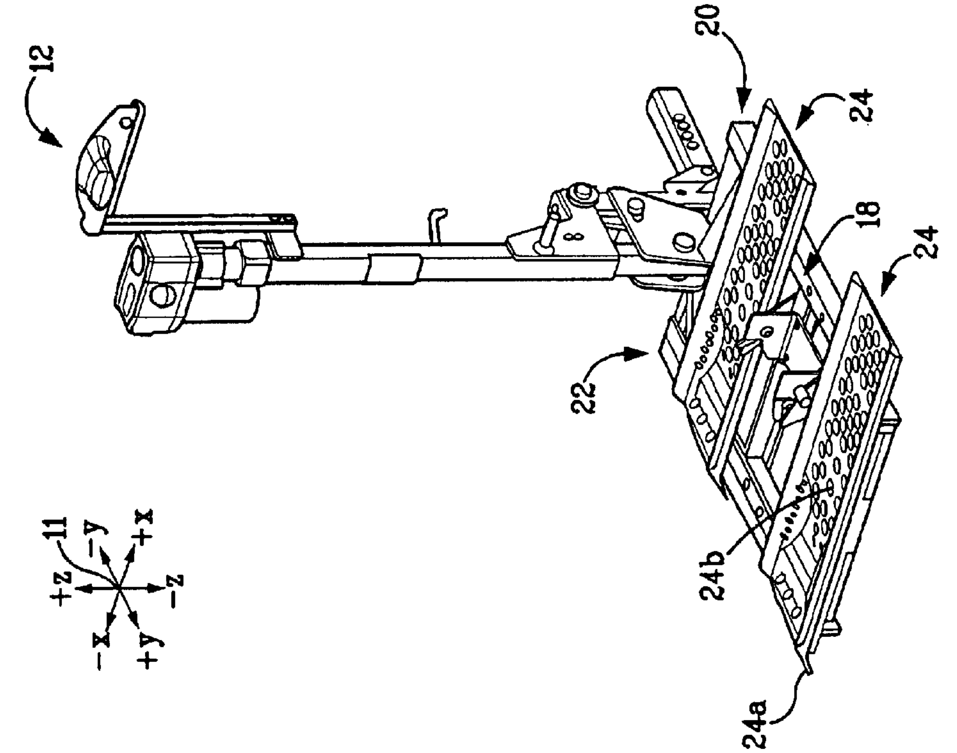
FIG. 1 is a perspective view of a receptacle of a presently-preferred device for securing a personal-transport vehicle to a lift and carrier assembly, with the receptacle installed on the lift and carrier assembly.

The first trunnion 74 is fixedly coupled to the lip 72*b*, and extends from the lip 72*b* substantially in the "+y" direction (from the perspective of FIG. 1). The second trunnion 76 is fixedly coupled to the lip 72*c*, and extends from the lip 72*c* substantially in the "−y" direction. The trunnions 74, 76 are sized to fit within the respective slots 44, 46 in the yoke arm 28 with minimal clearance.

The trunnion member 16 also comprises a third and a fourth lip 72*d*, 72*e* that each extend downwardly from the mounting portion 76*a*, forward of the first and second lips 72*a*, 72*b*. The lips 76*d*, 76*e* are angled with respect to the centerline Cl so that the width (y-axis dimension) of the trunnion member 16 reaches a minimum at the forward edge of the trunnion member 16. The significance of this feature is explained below.

The trunnion member 16 is secured to the power chair 14 by brackets 78. More particularly, the mounting portion 72*a* is positioned against a bottom surface of a beam 82 or other structural member that is located on the underside of the power chair 14. The brackets 78 are positioned above the beam 82 so that each bracket 78 straddles the beam 82. The brackets 78 are secured to the mounting portion 72*a* by elongated bolts 80. The bolts 80 are accommodated by through holes 84 formed in opposing ends of each bracket 78, and by through holes 86 formed in the mounting portion 72*a*. The beam 82 is thus clamped between the brackets 78 and the mounting portion 72*a*, thereby securing the trunnion member 16 to the power chair 14.

Figure 10:
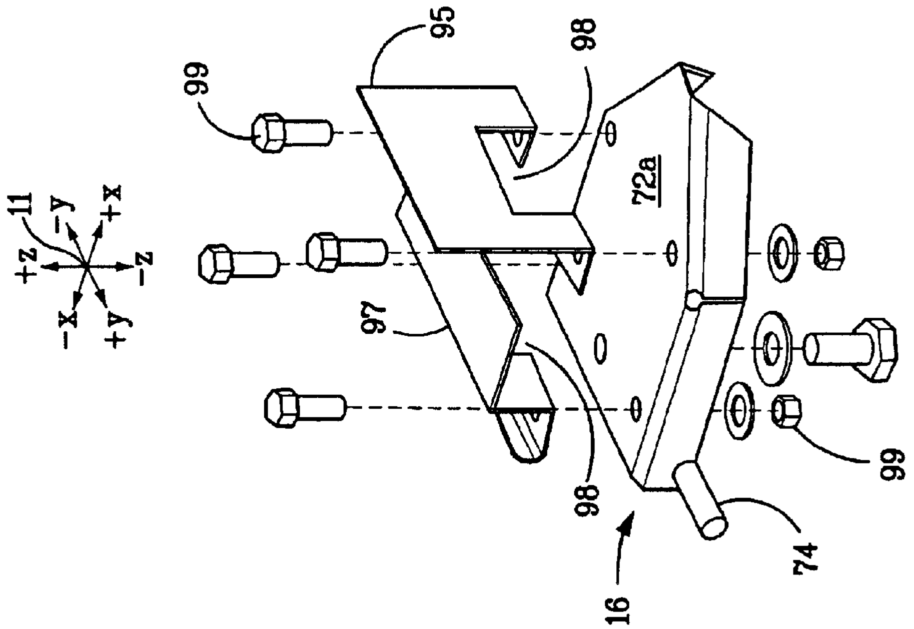
FIG. 10 is a partially exploded, perspective view of an alternative mounting configuration for a trunnion member of the presently-preferred device shown in FIGS. 1–8.

Alternatively, the trunnion member 16 may be secured to the power chair 14 as follows using a first and a second bracket 95, 97 (see FIG. 10). The mounting portion 72*a* of the trunnion member 16 is positioned against the bottom surface of a beam 82. The brackets 95, 97 are subsequently placed over the beam 82 so that the brackets 95, 97 straddle the beam 82, and the beam 82 passes through a rectangular opening 98 defined in each of the brackets 95, 97. The brackets 95, 97 are then secured to the mounting portion 72a using fasteners 99, thereby securing the trunnion member 16 to the power chair 14.

The device 10 secures the power chair 14 to the platform 20 through the engagement of the receptacle 18 and the trunnion member 16. More specifically, the receptacle 18 is positioned on the platform 20 so that the yoke arm 28 and the hook levers 30, 32 engage the trunnions 74, 76 when the power chair 14 is driven onto the platform 20 and the platform is raised. Details relating to these features are as follows.

The lift and carrier assembly 12, as previously noted, is adapted to move the platform 20 between a lower position suitable for loading the power chair onto the platform 20, and an upper position suitable for storing and transporting the power chair. Movement of the platform to and from its lower position causes the hook levers 30, 32 to move to and from their respective locking and releasing positions, in the following manner.

The wheels 55, 57 are located below the lowermost surface of the platform 20 when the hook levers 30, 32 are in their respective locking positions, as noted above (see FIG. 7). Moreover, the hook levers 30, 32 are biased toward their locking positions by the respective springs 60, 62. Hence, the hook levers 30, 32 are disposed in their locking positions when the platform 20 is in its upper position, away from the ground (see FIG. 6). Downward movement of the platform 20 toward its lower position eventually causes the wheels 55, 57 contact the ground. This contact, in conjunction with the angled orientation of the hook levers 30, 32 in relation the ground, causes the hook levers 30, 32 to rotate in a counterclockwise direction as the platform 20 approaches is lower position. Continued downward movement of the platform 20 eventually causes the hook levers 30, 32 reach their respective releasing positions as the platform 20 reaches its lower position.

The receptacle 18 is adapted to receive the trunnions 74, 76 when the hook levers 30, 32 are in their releasing positions. More particularly, movement of the hook levers 30, 32 to their releasing positions exposes the open-ended slots 44, 46 in the yoke arm 28 so that the trunnions 44, 46 can be inserted into the slots 44, 46 from the rearward direction (see FIGS. 6 and 8).

Figure 8:
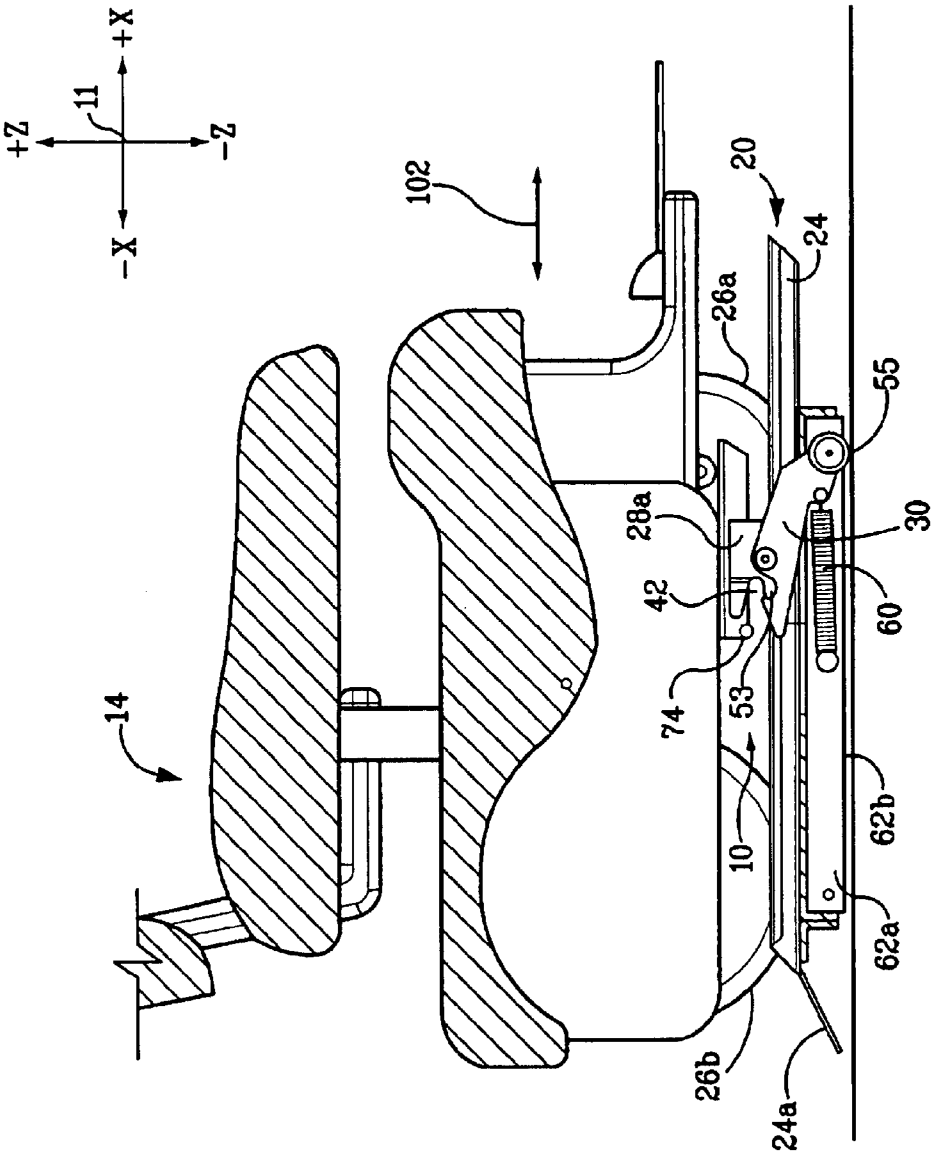
FIG. 8 is a side view of the presently-preferred device, the platform, and the power chair shown in FIGS. 1–7, depicting a cross-section of the power chair taken through the line "A—A" of FIG. 2 and a cross-section of the platform taken through the line "C—C" of FIG. 5, and depicting the platform in the lower position and the power chair approaching its stored position on the platform.

The receptacle 18 is positioned so that the trunnions 74, 76 substantially align with the slots 44, 46 when the power chair 14 is driven onto the platform 20, as depicted in FIG. 8. More specifically, the height (z-axis position) and the longitudinal (x-axis) position of the receptacle 18 are adjusted when the device 10 is installed on the lift and carrier assembly 12 so that the height and longitudinal position of the slots 44,46 are substantially equal to those of the respective trunnions 74, 76 when the power chair 14 is in its stored position on the platform 20. The height adjustment, as previously noted, is accomplished by installing an appropriate number of the washers 70. The longitudinal-position adjustment is accomplished by aligning the receptacle 18 with an appropriate set of through holes 66 in the bridge weldments 62, 64 prior to fastening the receptacle 18 to the bridge weldments 62, 64.

The slots 44, 46 and the trunnions 74, 76 are substantially aligned in the lateral (y) direction because the receptacle 18 is substantially centered with respect to the tracks 24, the trunnion member 16 is substantially centered with respect to the power chair 14, and the power chair 14 is substantially centered with respect to the tracks 24 as the power chair is driven onto the platform 20.

Movement of the power chair 14 toward its stored position eventually causes the trunnion member 16 to become disposed within the yoke arm 28, i.e., the trunnion member 16 enters the area between the side panels 28*a*, 28*b* of the yoke arm 28. Moreover, the movement of the trunnion member 16 in relation to the yoke arm 28 causes the trunnions 74, 76 to engage the slots 44, 46. (The angled orientation of the lips 76*d*, 76*e* on the trunnion member 16 lessens the potential for the trunnion member 16 to become lodged against the yoke arm 28 if the trunnion member 16 and the yoke arm 28 are misaligned as the trunnion member approaches the yoke arm 28.)

Continued movement of the power chair 14 toward the stored position causes the trunnions 74, 76 to fully engage the slots 44, 46, i.e., the trunnions 74, 76 eventually reach a forward-most position in the respective slots 44, 46 and the trunnions 74, 74. The longitudinal (x-axis) position of the receptacle 18 is preferably adjusted so that the rear wheels 26*b* of the power chair are slightly off-center, toward the rearward ("−x") direction, with respect to the curvilinear indentations 24*b* in the tracks 24 when the trunnions 74, 76 reach their forward-most positions in the slots 44, 46. This feature causes the power chair 14, by virtue of its weight, to exert a forward-acting force on the trunnions 74, 76, thereby ensuring that the trunnions 74, 76 fully engage the slots 44, 46.

It should be noted that the edges 28*e*, 28*f* on the yoke arm 28 are angled with respect to the horizontal plane. Moreover, the edges 30*a*, 30*b* on the respective hook levers 30, 32 are undercut so as to assume a similar angle when the hook levers 30, 32 are in the releasing position (see FIG. 6). The edges 28*e*, 28*f*, 30*a*, 30*b* are thus adapted to guide the trunnions 30 74, 76 into the slots 44, 46, and thereby compensate for slight vertical misalignment between the trunnions 74, 76 and the respective slots 44, 46. (These features also reduce the potential for the trunnions 74, 76 to become lodged against the yoke arm 28 if the trunnions 74, 76 and the respective slots 44, 46 are misaligned as the trunnions 74, 76 approach the slots 44, 46.)

Movement of the platform 20 toward its upper position, in conjunction with the bias of the springs 60, 62, cause the hook levers 30, 32 to rotate in a clockwise direction (from the perspective of FIGS. 6 and 7). The hook levers 30, 32 eventually rotate into their locking positions as the wheels 55, 57 break contact with the ground.

The edges 30*c*, 32*c* on the hook levers 30, 32 prevent the trunnions 74, 76 from backing out of the slots 44, 46 when the hook levers 30, 32 are in their locking positions. In particular, rotation of the hook levers 30, 32 to the locking position brings the rounded edges 30*c*, 32*c* thereof into contact (or close rearward proximity) with the respective trunnions 74, 76. (In other words, the trunnions 74, 76 become disposed within the respective indentations 53, 54 when the hook levers 30, 32 pivot into the locking position.)

The edges 30*c*, 32*c* substantially conform to the shape of the adjacent portions of the respective trunnions 74, 76, and are biased in the forward ("+x") direction by the effects of the springs 60, 62. The edges 30*c*, 32*c* thus interfere with movement of the trunnions 74, 76 rearward, toward the open ends of the respective slots 42, 43, and thereby constrain the trunnions 74, 76 within the slots 42, 43. In other words, the hook-shaped portion 30*e*, 32*e* of the hook levers 30, 32 securely engage the respective first and second trunnions 72, 74 so that the first and second trunnions 72, 74 are restricted from moving toward the open ends of the 20 respective slots 42, 43.

The trunnions 74, 76 are restrained from substantial forward movement by the respective edges 28*i*, 28*j*, which define the forward ends of the respective slots 42, 43. The noted constraint of the trunnions 74, 74 by the edges 30*c*, 32, 28*i*, 28*j* secures the trunnion member 16 to the receptacle 18.

Returning the platform 20 to its lower position causes the wheels 55, 57 to once again contact the ground, thereby causing the hook levers 30, 32 to rotate to their releasing positions and permitting the trunnions 74, 76 to back out of the slots 44, 46.

The engagement of the trunnion member 16 and the receptacle 18 secures the power chair 14 in its stored position on the lift and carrier assembly 12. In particular, the engagement of the trunnions 74, 76 by the hook levers 30,

32 and the yoke arm 28 restrains the power chair 14 in relation to the platform 20 in the longitudinal ("x") and vertical ("z") directions. The power chair 14 is restrained in the lateral ("y") direction by interference between the lips 72*b*, 72*c* of the trunnion member 16, and the side panels 28*a*, 28*b* of the yoke arm 28.

Notably, the engagement of the trunnion member 16 and the receptacle 18 restrains the power chair 14 from rotational movement about the "x" and "y" axes. This feature is facilitated by the use of the two trunnions 74, 76 spaced apart from the centerline Cl of the receptacle 18. The ability of the device 10 to restrain the power chair 14 from rotational movement represents a substantial advantage in relation to conventional power-chair restraints that inhibit linear motion only. For example, the added degree of restraint provided by the power chair 14 inhibits the power chair 18 from swiveling about the vertical axis as the transporting vehicle turns at relatively high speed, brakes suddenly, or bounces in response to rough road conditions. This added stability substantially reduces the potential for the power chair 14 to separate from the platform 20 as it is being transported.

The presently-preferred device 10 provides additional advantages associated with its adaptability to various types of personal-transport vehicles. In particular, the device 10 interfaces with a personal transport vehicle by way of a structural member located on the underside of the vehicle, e.g, the beam 82 of the power chair 14. Most personal-transport vehicles comprise a structural member suitable for this purpose. Moreover, the positions of the receptacle 18 and the trunnion member 16 can be adjusted in the above-described manner to accommodate personal-transport vehicles of difference sizes and configurations. Hence, the device 10 can be used in conjunction with personal-transport vehicles that range widely in size and general overall configuration.

Notably, the positions of the receptacle 18 and the trunnion member 16 can be adjusted without removing or otherwise altering the relationship between the hook levers 30, 32 and the yoke arm 28. In other words, the locking geometry of the device 10 remains constant regardless of the particular application in which the device 10 is used. Hence, a time-consuming readjustment of the locking geometry is not required each time the device 10 is used with a different type of personal-transport vehicle.

Devices that rely on a hold-down arm or similar mechanism, in contrast, are restricted to use with personal-transport vehicles having a suitable rigid surface within the range of motion of the hold-down arm. Certain types of personal-transport vehicles currently in widespread use, e.g., power chairs, are not commonly equipped with such a surface, as noted above. Hence, the device 10 can be adapted for use with a substantially greater variety of personal-transport vehicles than devices comprising a hold-down arm.

The device 10 is particularly well suited for use with three-wheeled personal-transport vehicles. These type of vehicles, as previously noted, typically comprise a centrally-located wheel. The device 10 is compatible with platforms configured to accommodate a centrally-located third wheel. In particular, a third track 24 can be installed on the platform 20 without interfering with the operation of the device 10. The use of the third track 24 is possible due to the U-shaped configuration of the yoke arm 28, which permits the third track 24 to be placed within the yoke arm 28, i.e., between the side panels 28*a*, 28*b*. The device 10 can be operated in the above-described manner with the third track 24 in place, provided the slots 44, 46 remain above the plane of the third track 24. This feature stands in contrast to conventional devices comprising a single, centrally-located pin. These types of devices, as noted above, cannot by used in conjunction with a platform having a third, centrally-located track.

Additional advantages of the device include its self-centering ability. In particular, the trunnions 74, 76 tend to straighten the power chair 14 with respect to the centerline Cl when the trunnions 74, 76 re driven forward into the slots 44, 46. Moreover, the trunnions 44, 46 and the hook levers 30, 32 remain visible after the power chair 14 has been placed in its stored position on the platform 20. Hence, the latching mechanism 10 provides a positive visual indication that the power chair 14 has been secured to the platform 20.

Furthermore, the device 10 is fully automatic, and requires no effort on the part of the user other than driving the power chair 14 onto the platform 20 in the normal manner. The device 10 is also self-locating, i.e., the device 10 stops the forward movement of the power chair 10 when the trunnion member 16 has fully engaged the receptacle 18.

It is to be understood that even though numerous characteristics and advantages of the present invention have been set forth in the foregoing description, together with details of the structure and function of the invention, the disclosure is illustrative only, and changes may be made in detail, especially in matters of shape, size, and arrangement of the parts, within the principles of the invention to the full extent indicated by the broad general meaning of the terms in which the appended claims are expressed.

What is claimed is:

1. A device for securing a personal-transport vehicle to a platform movable between a lower position proximate the ground, and an upper position, comprising:

a trunnion member comprising a trunnion bracket adapted to be fixedly coupled to the personal-transport device, and a first and a second trunnion fixedly coupled to opposing sides of the trunnion bracket; and a receptacle comprising (i) a yoke arm adapted to be fixedly coupled to the platform and comprising a first and an opposing second side panel each having a slot formed therein, the slots each having an open end through which the slots are adapted to receive a respective one of the first and second trunnions, and a closed end, and (ii) a first and a second hook lever pivotally coupled to the respective first and second side panels, wherein the first and second hook levers are pivotally biased so that the first and second hook levers contact the respective first and second trunnions and interfere with movement of the respective first and second trunnions toward the open ends of the respective slots when the platform is in the upper position, whereby the trunnion member is secured to the receptacle.

2. The device of claim 1, wherein the yoke arm further comprises a bottom panel fixedly coupled to the side panels and being substantially perpendicular thereto so that the yoke arm is substantially U-shaped.

3. The device of claim 1, wherein the first and second hook levers are pivotally biased by a respective first and second spring coupled to the respective first and second hook levers and the platform.

4. The device of claim 1, further comprising a first and a second bridge weldment adapted to be fixedly coupled to a frame of the platform and the receptacle, wherein the first and second bridge weldments each have a substantially L-shaped cross section and are adapted to support edges of the yoke arm.

5. The device of claim 1, wherein the first and second trunnions intersect respective planes of rotation of the first and second hook lever when the first and second trunnions are positioned within the respective slots.

6. The device of claim 1, wherein the platform is movable in a first direction between the upper and lower positions and the first and second trunnions extend from the opposing sides of the trunnion bracket along an axis oriented in a second direction substantially perpendicular to the first direction.

7. The device of claim 6, wherein the slots are adapted to receive the first and second trunnions in a third direction substantially perpendicular to the first and second directions.

8. The device of claim 1, further comprising a first and a second wheel rotatably coupled to the respective first and second hook levers and being adapted to contact the ground when the platform is moved from the upper to the lower position, the contact between the wheels and the ground causing the first and second hook levers to pivot away from the respective first and second trunnions thereby releasing the first and second trunnions from the receptacle.

9. The device of claim 8, wherein a first end of the respective first and second hook levers contacts the respective first and second trunnions, the first and second wheels are rotatably coupled to respective second ends of the respective first and second hook levers, and the first and second hook levers each pivot about a point located between the respective first and second ends.

10. The device of claim 1, wherein the trunnion member further comprises a mounting portion and a first and second lip portion extending from the mounting portion, wherein the trunnions are fixedly coupled to the respective first and second lip portions.

11. The device of claim 10, wherein the trunnion member comprises a third lip extending from the mounting portion adjacent the first lip, and a fourth lip extending from the mounting portion adjacent the second lip, the third and fourth lips being angled in relation to the respective first and second lips so that a forward end of the trunnion member is narrower than a rearward end of the trunnion member.

12. The device of claim 10, wherein the trunnion member is adapted to be fixedly coupled to the personal-transport device by a bracket adapted to engage a structural member on the personal-transport device so that the structural member is securely positioned between the bracket and the mounting portion.

13. The device of claim 1, wherein the first and second hook levers each have a substantially rounded edge portion and the substantially rounded edge portions interfere with movement of the respective first and second trunnions toward the open ends of the respective slots when the platform is in the upper position.

14. The device of claim 13, wherein the rounded edge portions substantially conform to a portion of an outer circumference of the respective first and second trunnions.

15. The device of claim 13, wherein the first and second hook levers each have a substantially straight portion adjoining the respective substantially rounded edge portions to thereby form a hook-shaped portion on the respective first and second hook levers, and the hook-shaped portions interfere with movement of the respective first and second trunnions toward the open ends of the respective slots when the platform is in the upper position.

16. The device of claim 15, wherein the slots are adapted to receive the respective first and second trunnions in a first direction and the first and second side panels each have an edge portion adjoining an edge of the respective slots and being angled in relation to the first direction so that the respective edge portions are adapted to guide the first and second trunnions into the respective slots.

17. The device of claim 16, wherein the substantially straight portions of the respective first and second hook levers and the edge portions of the respective first and second side panels are oriented at a substantially identical angle when the platform is in the lower position.

18. A device for securing a personal-transport vehicle to a platform of a lift and carrier assembly adapted to move the platform between a lower position proximate the ground, and an upper position, comprising:

- a trunnion member comprising (i) a trunnion bracket adapted to be fixedly coupled to the personal-transport vehicle and having a first and an opposing second lip portion, and (ii) a first and a second substantially cylindrical trunnion fixedly coupled to and extending from the respective first and second lip portions; and
- a receptacle comprising (i) a substantially U-shaped yoke arm adapted to be fixedly coupled to the platform and comprising a first and an opposing second side panel each having a slot formed therein, the slots each having an open end through which the slots are adapted to receive a respective one of the first and second trunnions, and a closed end, and (ii) a first and a second hook lever pivotally coupled to the respective first and second side panels and being movable to and from a locking position and a releasing position in response to movement of the platform to and from the upper to the lower positions, wherein the first and second hook levers each have a substantially hook-shaped portion adapted to securely engage the respective first and second trunnions when the first and second hook levers are in the locking position so that the first and second trunnions are restricted from moving toward the open ends of the respective slots, whereby the trunnion member is secured to the receptacle when the platform is in the upper position.

19. The device of claim 18, wherein the first and side panels each comprise a tab portion extending therefrom and adapted to contact the respective first and second hook levers when the first and second hook levers are in the locking position and thereby interfere with pivotal movement of the first and second hook levers past the locking position.

20. The device of claim 18, wherein the platform is movable in a first direction between the upper and lower positions and the first and second trunnions extend from the respective first and second lip portions along an axis oriented in a second direction substantially perpendicular to the first direction.

21. The device of claim 20, wherein the slots are adapted to receive the first and second trunnions in a third direction substantially perpendicular to the first and second directions.

22. The device of claim 18, further comprising a first and a second wheel rotatably coupled to the respective first and second hook levers and being adapted to contact the ground when the platform is moved from the upper position to the lower position, the contact between the wheels and the ground causing the first and second hook levers to pivot from the locking position to the releasing position thereby releasing the first and second trunnions from the receptacle.

23. The device of claim 22, wherein the first and second hook levers are biased so that the first and second hook levers pivot toward the locking position when the platform is moved from the lower position to the upper position.

24. A device for securing a personal-transport vehicle to a platform movable between a lower position proximate the ground, and an upper position, comprising:

a trunnion member comprising a trunnion bracket adapted to be fixedly coupled to the personal-transport vehicle, and a first and a second trunnion fixedly coupled to opposing sides of the trunnion bracket; and a receptacle comprising (i) a yoke arm adapted to be fixedly coupled to the platform and comprising a first and an opposing second side panel each having a slot formed therein, the slots being adapted to receive a respective one of the first and second trunnions, and (ii) means for confining the first and second trunnions within the respective slots responsive to movement of the platform from the lower to the upper positions.

25. The device of claim 24, wherein the platform is movable in a first direction between the upper and lower positions and the first and second trunnions extend from the opposing sides of the trunnion bracket along an axis oriented in a second direction substantially perpendicular to the first direction.

26. A device for securing a personal-transport vehicle to a platform of a lift and carrier assembly adapted to move the platform in a first direction between a lower position proximate the ground, and an upper position, comprising:

a trunnion member comprising (i) a trunnion bracket adapted to be fixedly coupled to the personal-transport vehicle and having a first and an opposing second lip portion, and (ii) a first and a second trunnion fixedly coupled to and extending from the respective first and second lip portions along an axis oriented in a second direction substantially perpendicular to the first direction; and a receptacle comprising (i) a substantially U-shaped yoke arm adapted to be fixedly coupled to the platform and comprising a first and an opposing second side panel each having a slot formed therein, the slots being adapted to receive the respective first and second trunnions through respective open ends thereof, and the slots each having a closed end defined by a substantially curvilinear edge portion on the respective first and second side panels, and (ii) a first and a second hook lever pivotally coupled to the respective first and second side panels and being movable between a locking position and a releasing position, wherein the first and second hook levers are biased toward the locking position, the first and the second trunnions intersect respective planes of rotation of the first and second hook levers, the first and second hook levers are adapted to urge the respective first and second trunnions toward the substantially curvilinear edge portions on the respective first and second side panels when the first and second hook levers are in the locking position thereby securing the trunnion member to the receptacle, and (iii) a first and a second wheel rotatably coupled to the respective first and second hook levers and being adapted to contact the ground when the platform is moved from the upper to the lower position, the contact between the wheels and the ground causing the first and second hook levers to pivot away from the respective first and second trunnions thereby releasing the first and second trunnions from the receptacle.

* * * * *

UNITED STATES PATENT AND TRADEMARK OFFICE

CERTIFICATE OF CORRECTION

PATENT NO. : 6,837,666 B1 Page 1 of 1
DATED : January 4, 2005
INVENTOR(S) : Thomas A. Panzarella, James B. Eldon, III and David D. McClanahan It is certified that error appears in the above-identified patent and that said Letters Patent is hereby corrected as shown below:

Column 1,
Line 44, please delete "theat" and insert -- that -- therefor.

Column 3,
Line 35, please delete "shaped" and insert -- U-shaped -- therefor.

Column 5,
Line 18, after "platform 20", please delete "is" therefor.
Line 27, after "24" please delete "30" therefor.

Column 6,
Line 64, after "past", please delete "the" therefor.

Column 12,
Line 5, please delete "by" and insert -- be -- therefor.
Line 11, please delete "re" and insert -- are -- therefor.

Signed and Sealed this

Sixth Day of September, 2005

JON W. DUDAS
*Director of the United States Patent and Trademark Office*